H. M. CLARK.
Hand Rake.
No. 82,207.  Patented Sept. 15, 1868.
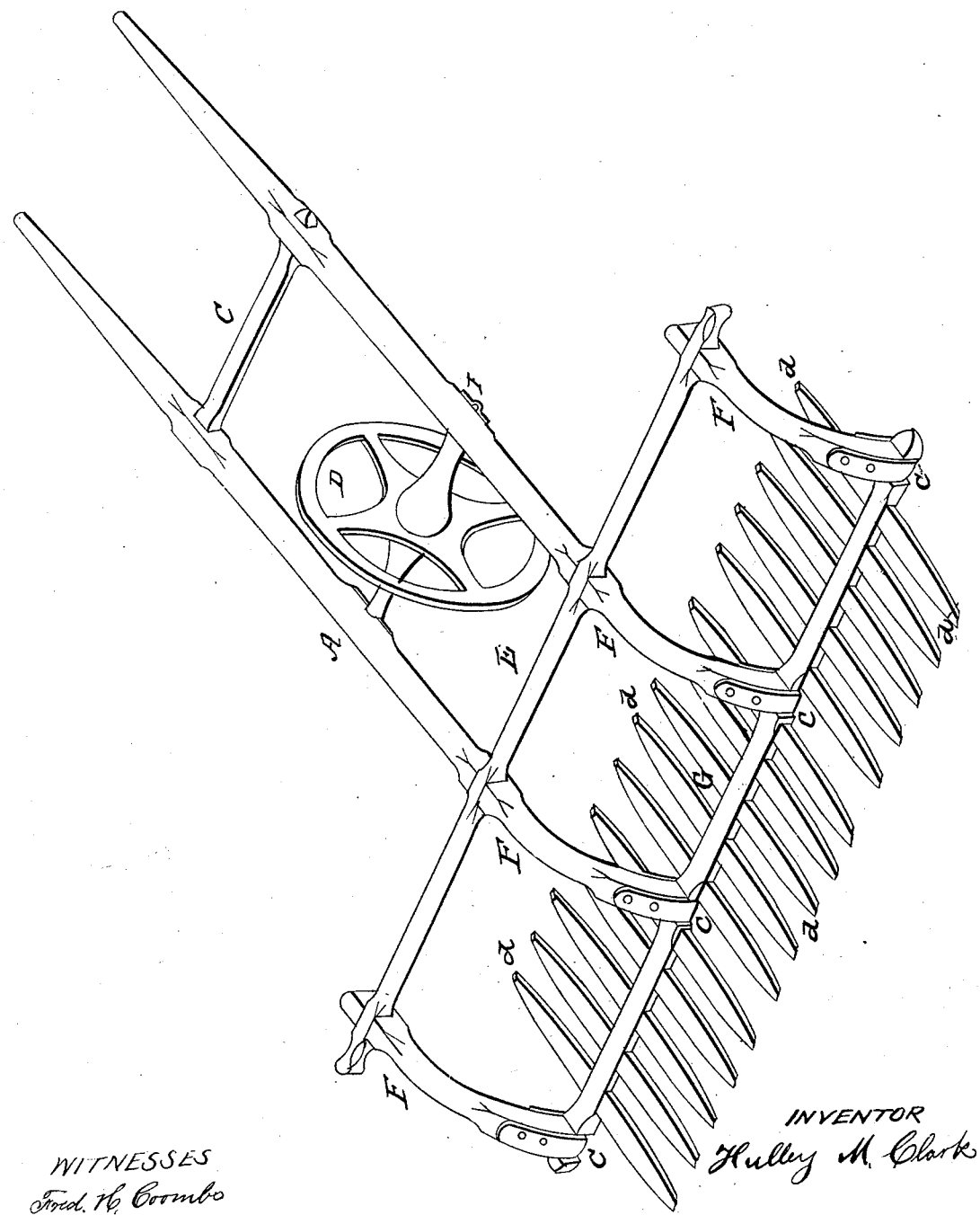
WITNESSES
Fred. H. Coombs
Samuel W. Doane
INVENTOR
Hulley M. Clark

United States Patent Office.

HOLLEY M. CLARK, OF BREWER, MAINE.

Letters Patent No. 82,207, dated September 15, 1868.

IMPROVEMENT IN HAND-RAKE.

*The Schedule referred to in these Letters Patent and making part of the same.*

TO ALL WHOM IT MAY CONCERN:

Be it known that I, HOLLEY M. CLARK, of Brewer, in the county of Penobscot, and State of Maine, have invented a new and improved Hand Hay-Rake; and I do hereby declare that the following is a full, clear, and exact description thereof, which will enable others skilled in the art to make and use my invention, reference being had to the accompanying drawings, and to the letters of reference marked thereon.

A and B are shafts.
C, a cross-piece or tie.
D, a wheel.
E, a cross-beam.
F F F F are arms.
G, a rake-head.
a and b, handles of shafts A B.
c c c c, bands securing rake-head to arms.
d d d d, teeth of the rake.

I will now describe the construction and operation of my invention.

I construct the shafts A B, and form thereon the handles a b. The handles a b may be straight, as shown in the drawings, or curved upward, if desired. I connect the shafts by the tie C. The shafts are so spaced that a man may stand easily between them and grasp the handles a b. I provide the wheel D, and secure the same between the shafts A B, as shown. The wheel D is of such diameter that the operator, bearing down upon the handles, can reverse the rake without stooping much, if any.

I construct the cross-beam E, and mortise or otherwise secure the same to the shafts A B.

I construct the curved arms F F F F, as shown. The middle arms are formed by the ends of the shafts A B, and the arms are all secured to the cross-beam E. I provide a rotary rake, of which G is the rake-head and d d d the teeth, and attach the same to the arms F F F F by means of bands c c c c, as shown in the drawings, or by other similar contrivance, allowing the free rotation of the rake.

The rake-teeth d d d are tapered towards the point, as shown, so as to pass freely through the stubble.

In operation, the operator stands between the shafts A B, facing the rake, grasps the handles a b, and runs the machine forward. The teeth d d d pass through the stubble and gather the hay. When the rake is loaded with hay, the operator bears down on the shafts, and throws the rake-head up, the wheel D acting as a fulcrum. The weight of the hay causes the rake-head to turn in the bands c c c c; then, as the machine is run forward, the teeth d d d d engage with the ground, and the rake is turned over, depositing the hay so as to form the windrow. The operation is continued, each "turning over" of the rake forming a windrow.

In general, I proportion the machine as follows:
Total length of shafts, seven feet.
Length of curved arms, fifteen inches.
Length of rake-head, six feet.
Length of teeth, from points to roots, thirteen inches.
Diameter of wheel, three and one-half feet.

From practical test I find that with my improved hand hay-rake, one man can perform the labor of five or six men with the ordinary hay-rake; that the hay is raked and the windrows properly formed at one operation; that the machine is especially adapted to lands where, from the wet and uneven character of the ground, the horse hay-rake cannot be used; and that the operator being behind the rake, and pressing the same forward, can see his work, and can guide and operate the machine with the greatest ease and facility.

I do not claim as my invention the rotating rake-head, as the same has heretofore been used upon horse-rakes; but What I do claim as my invention, and desire to secure by Letters Patent, is—

The shafts A B, wheel D, tie C, cross-beam E, and arms F F F F, in combination with the rotating rake G d d d, all constructed and operating substantially in the manner and for the purposes shown and described.

HOLLEY M. CLARK.

Witnesses:
FRED. H. COOMBS,
SAMUEL W. DOANE.